United States Patent [19]

Martucci et al.

[11] Patent Number: 5,046,763
[45] Date of Patent: Sep. 10, 1991

[54] QUICK CONNECT HOSE COUPLING ASSEMBLY

[75] Inventors: Norman S. Martucci, Birmingham; Richard Barton, Algonac, both of Mich.

[73] Assignee: Teleflex Incorporated, Limerick, Pa.

[21] Appl. No.: 473,571

[22] Filed: Feb. 1, 1990

[51] Int. Cl.⁵ ............................................. F16L 21/08
[52] U.S. Cl. ...................................... 285/81; 285/257; 285/322; 285/319
[58] Field of Search ............... 281/45, 81, 319, 301, 281/322, 323, 911

[56] References Cited

U.S. PATENT DOCUMENTS

| | | | |
|---|---|---|---|
| 3,097,866 | 7/1963 | Iversen | 285/257 |
| 4,573,716 | 3/1986 | Guest | 285/323 |
| 4,666,190 | 5/1987 | Yamabe et al. | 285/257 |
| 4,666,192 | 5/1987 | Zamora | 285/257 |
| 4,781,400 | 11/1988 | Cunningham | 285/319 |
| 4,790,571 | 12/1988 | Montanari et al. | 285/322 |
| 4,846,506 | 7/1989 | Bocson et al. | 285/319 |
| 4,902,045 | 2/1990 | McGugan et al. | 285/322 |

FOREIGN PATENT DOCUMENTS 741108  2/1933  France ............................. 285/257

Primary Examiner—Eric K. Nicholson
Attorney, Agent, or Firm—Reising, Ethington, Barnard, Perry & Milton

[57] ABSTRACT

A quick connect hose coupling assembly (10) of the type for joining fluid carrying conduits, including a female member (12) and a male member (40). The female member (12) has an annular portion (20) and a plurality of slots (21) defining fingers (22). The fingers (22) extend longitudinally from the annular portion (20) to a distal end (23). The male member (40) is inserted into a bore (50) defined by the female member (12). A flange (54) on the male member (40) engages a groove (52) in the female member (12) for limiting longitudinal movement of the male member (40) with respect to the female member (12) when the male member (40) is inserted in the bore (50) of the female member (12). A locking ring (64) is disposed in the groove (66) on the fingers (22) to prevent both outward radial movement of the fingers (22) and relative longitudinal movement between the male (40) and female (12) members. A sealing boot (58) is integral with the locking ring (64) and extends about the distal end (23) of the fingers (22). The boot (58) engages the male member (40) and an inward tapered surface (48) of the female member (12) to prevent contamination from entering the interior of the female member (12).

24 Claims, 1 Drawing Sheet

QUICK CONNECT HOSE COUPLING ASSEMBLY

TECHNICAL FIELD

The present invention relates to couplings for joining fluid conduits. More specifically, the present invention relates to a quick connect coupling for connecting fluid carrying conduits.

BACKGROUND ART

Several quick connect pipe couplings are known in the art. For example, U.S. Pat. No. 4,730,856 to Washizu issued Mar. 15, 1988 discloses such an assembly. This patent discloses a coupling having a male member disposed within a female member. The female member is disposed about the exterior of a pipe inserted through the female member. A male member is inserted into the female member and is adapted for fixed connection thereto. The male member has an annular flange about the periphery thereof. The female member has an annular portion and a plurality of fingers extending therefrom. The annular flange is adapted for mating engagement with a portion of the fingers to prevent relative axial movement between the male and female members.

Another example of a quick connect coupling is shown in U.S. Pat. No. 4,765,199 to Andersen et al issued Aug. 23, 1988. The assembly includes a male member disposed in a female member and locked therein. The female member has a plurality of fingers which expand radially outwardly to insert the male member into the female member. A locking ring is provided to lock the fingers and outward radial movement of the fingers once the male member has been inserted into the female member.

U.S. Pat. No. 4,645,245 to Cunningham discloses yet another type of quick connect tube coupling. The assembly includes a male member having a plurality of grooves therein A female member is disposed about the male member and fixed thereto. One of the grooves of the male member receives and holds a seal to prevent dust or other debris from passing between the male member and the female member.

Similarly, U.S. Pat. No. 4,111,464 to Asano et al, issued Sep. 5, 1978 discloses a pipe coupling assembly. The assembly includes a male member adapted for insertion into a female member. The female member is annular and has a groove for receiving a seal therein. An outer seal is provided for preventing contamination from moving past the outer seal and down the male member and entering the female member.

All of the prior art patents are deficient in that none disclose a female member having a plurality of radially expanding fingers, which fingers have a seal about the outward end thereof for preventing contamination from moving therepast.

SUMMARY OF THE INVENTION AND ADVANTAGES

According to the present invention, there is provided a quick connect hose assembly. The assembly comprises a female member having an annular portion. A plurality of fingers extend longitudinally from the annular portion to a distal end and are expandable radially outwardly. The assembly further includes a male member adapted for mating engagement with at least a portion of the female member and for being retained in the female member by the fingers. The assembly is characterized by the female member including sealing means for disposition on the distal ends of the fingers and for engaging the male member and preventing contamination from entering the female member.

Accordingly, there is provided a quick connect hose coupling having a plurality of radially expanding fingers for facilitating insertion of the male member into the female member. Further, a seal is provided above the distal ends of the fingers for preventing contaminations from moving past the distal ends of the fingers and into the female member.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

A quick connect hose coupling assembly of the type made in accordance with the instant invention is generally shown at 10 in the Figures.

Figure 1:
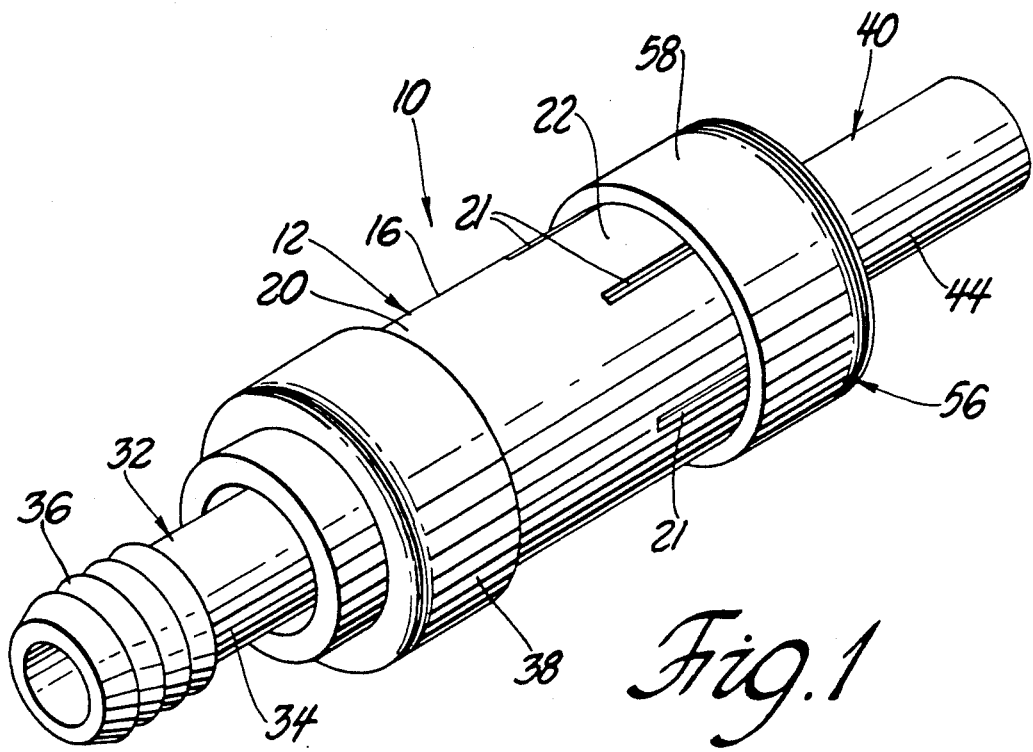
FIG. 1 is a perspective view of an assembly according to the instant invention.
Figure 2:
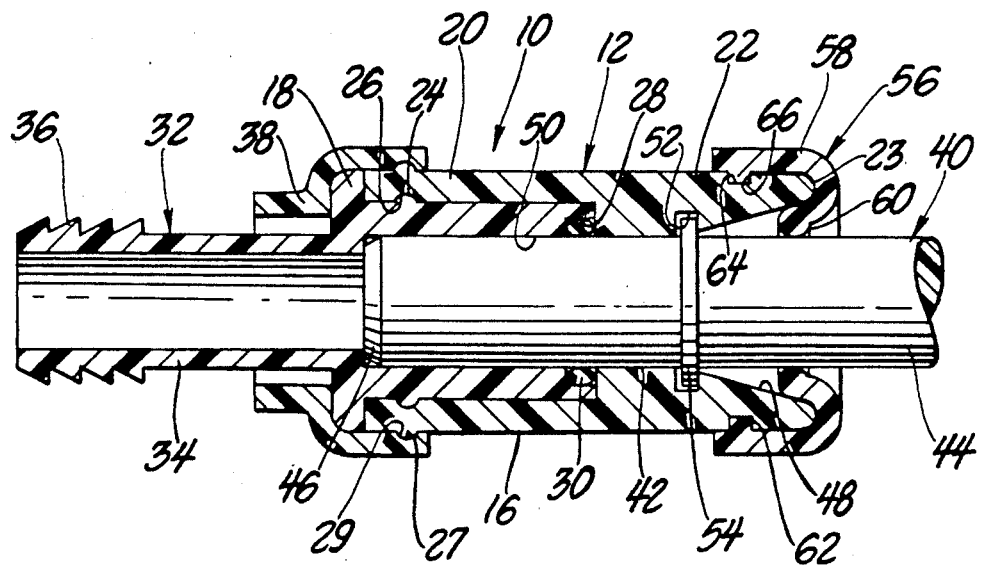
FIG. 2 is a side view of the instant invention shown in cross section.

The assembly 10 includes a female member generally indicated at 12. In the preferred embodiment, the female member 12 includes a first inner member 14 and a second outer member 16 as best seen in FIG. 2. The first inner member 14 is annular and has an annular shoulder 18 extending radially outwardly therefrom. The second outer member 16 is disposed over the first inner member 14 and is integrally connected to the first inner member 14. The second outer member 16 has an annular portion 20. This annular portion 20 is disposed about the first inner member 14. The second outer member 16 further has a plurality of slots 21 defining a plurality of fingers 22 thereon and extending longitudinally and away from the annular portion 20.

The first inner member 14 and second outer member 16 are integrally connected by frictional engagement. Specifically, the first inner member 14 has an annulary raised lip 24 thereon. The annular portion 20 of the second outer member has an annular groove 26 adapted for mating engagement with the annularly raised lip 24. To lock the first inner member 14 and second outer member together, the annular portion 20 of the outer member 16 is slid over the first inner member 14 until the second outer member 16 engages the raised shoulder 18 of the first inner member. In this position, the annulary raised lip 24 of the first inner member 14 is locked into the groove 26 of the second outer member 16.

The fingers 22 of the second outer member 16 extend longitudinally away from the annular portion 20 to a distal end 23. The number of fingers can vary. It is important that the fingers 22 can flex radially outwardly. This facilitates insertion of the male member as will be described in greater detail subsequently.

As best seen in FIG. 2, the first inner member 14 as a notch at the end thereof. The second outer member 16, and more particularly, the fingers 22, have an inward wall extending downwardly which engages the notch when the second outer member 16 is connected with the first inner member 14. When this connection is made, a groove 28 is defined by the notch in the first inner member 14 in the inwardly extending wall of the second outer member 16. In other words, the first inner member 14 and second outer member 16 form a groove 28 therebetween. Inner sealing means 30 are disposed in the groove 26 for preventing fluid from moving therepast. Specifically, the inner sealing means 30 comprises an O-ring seal 30 disposed in the groove 28. Alternatively, the inner sealing means 30 can comprise a lip seal or any other configuration seal which would prevent fluid from moving therepast.

The female member 12 further includes engagement means 32 for securing the female member 12 to a fitting, such as a resilient tube (not shown). The engagement means 32 includes a longitudinally extending tube portion 34. The tubular portion 34 has a plurality of barbs 36 thereon. The barbs 36 are particularly adapted from insertion into the tube retain the female member 12 in the fitting and prevent relative longitudinal movement therebetween.

As has been previously described, the female member 12 is preferably formed by a two piece assembly. Specifically, the female member 12 comprises the first inner member 14 and second outer member 16. This arrangement is particularly well adapted for simply molding the groove 28 into the female member. It will be appreciated the inner member 14 and outer member 16 can be formed together, i.e., made integral, to yield a unitary or one piece female member 12.

The assembly 10 further includes outer sealing means 38 disposed about the first inner member 14 and second outer member 16. The outer sealing means 38 comprises an annular boot 38. The annular boot 38 engages the shoulder 18 of the first inner member 14. The boot 38 further engages the annular portion 20 of the second outer member 16. Specifically, the outer member 16 has a lip 27 thereon The outer annular boot 38 has an annular groove 29. When the boot 38 is positioned over the outer member 16, the lip 27 is inserted into the groove 29, preventing relative longitudinal movement between the outer member 16 and boot 38. This prevents contamination from moving between the first inner member 14 and second outer member 16 into the interior of the female member 12.

The assembly 10 further includes a male member generally indicated at 40. The male member 40 has a leading portion 42 adapted for insertion into the female member 12. Further, the male member has a trailing portion 44. The male member 40 is preferably tubular and is for carrying fluids such as fuels through the interior thereof.

The leading portion 42 of the male member 40 has a beveled surface 46 to facilitate installation of the male member 40 into the female member 12. The distal ends of the fingers 22 have an inward tapered surface 48 to facilitate insertion. Further, the fingers 22 and first inner member 14 define a bore 50 therethrough. The bore 50 is for receiving the leading portion 42 of the male member 40.

Between the bore 50 and inwardly tapered surface 48 of the fingers, is disposed an inner annular groove 52. The male member 40 further includes an outer radial flange 54. The outer radial flange 54 is disposed between the leading portion 42 and trailing portion 44 of the male member 40. The outer radial flange 54 is for disposition in the inner annular groove 52 of the female member 12 for preventing relative axial movement between the male member 40 and female member 12. The flange 54 further limits the forward movement of the male member 40 during insertion. That is, when the flange 54 engages the groove 52 further insertion of the male member 40 is prevented. This prevents the beveled surface 46 from being damaged by contacting the back wall of the first inner member 14.

The assembly 10 further includes primary sealing means generally indicated at 56 for disposition on the distal end of the fingers 22 and for engaging the male member 40 for preventing contamination from entering the female member 12. Specifically, the sealing means 56 comprises a resilient boot 58 disposed about the distal ends of the fingers 22. The boot 58 includes an engagement portion 60. The engagement portion 60 engages the trailing portion 44 of the male member 40. Further, the engagement portion 60 engages the inwardly tapered surface 48 of the fingers 22. In this manner, contaminants are preventing from moving past the distal ends of the fingers 22 and trailing portion 44 of the male member and into the bore 50 of the female member 12.

The assembly further includes locking means generally indicated at 62. The locking means 62 is disposed about the exterior of the female member 12 for selectively locking the fingers 22 by preventing radial movement of the distal end of the fingers 22. Specifically, the locking means 62 comprises a locking ring 64. The locking ring 64 is preferably integral with the boot 58. The locking ring 64 extends inwardly from the boot 58, as best seen in FIG. 2. Further, the locking means 62 comprises a locking groove 66 disposed on the exterior of the fingers 22. The locking ring 64 is adapted for disposition into the locking groove 66 to prevent outward radial movement of the fingers 22.

In operation, the female member 12 is initially assembled by positioning the second outer member 16 over the first inner member 14 such that the second outer member 16 engages the annular shoulder 18 of the first inner member 14. In this manner, the annular raised lip 24 of the first inner member 14 engages the groove 26 of the second outer member 16 and prevents relative longitudinal movement between the first inner member 14 and second outer member 16. The outer sealing means 38 is then positioned by engaging the annular shoulder 18 and extending over the second outer member 16. The tubular portion 34 is then inserted into a fitting until the barbs 38 engage the fitting by preventing relative longitudinal movement between the fitting and the female member 12. The female member 12 is then ready to receive the male member 40. This is accomplished by inserting the leading portion 42 through the inwardly tapered surface 48 of the fingers 22 until the outer radial flange 54 of the male member 40 engages the inward annular groove 52 of the female member 12. As the flange 54 is moving through the inwardly tapered surface 48 of the fingers 22, the fingers 22 flex radially outwardly to permit movement of the flange 54 therepast. When the flange 54 reaches the groove 52, the fingers 22 return to their normal position, i.e., are not flexed outwardly. The boot 58 is then slid over the distal end of the fingers 22 until the locking ring 64 engages the locking groove 66 of the female member 22. When the locking ring 64 is in the locking groove 66, outward radial movement of the fingers 22 is prevented, and the male member 40 is locked with the female member 12. In other words, in this position, relative longitudinal movement between the male member 40 and female member 12 is prevented. Further, the engagement portion 60 of the boot 58 engages both the inner tapered surface 48 of the fingers 22 and the trailing edge 44 of the male member 40 to prevent contamination from entering the bore 50 of the female member 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A quick connect hose coupling assembly (10) comprising:
   a female member (12) having an annular portion (20) and a plurality of fingers (22) extending longitudinally from said annular portion (20) to a distal end (23) and expandable radially outwardly;
   a male member (40) adapted for mating engagement with at least a portion of said female member (12);
   locking means (62) for disposition around the exterior of said female member (12) for selectively locking said fingers (22) by preventing outward radial movement of said distal end (23) of said fingers (22);
   said female member (12) including sealing means (56) for disposition on said distal ends (23) of said fingers (22) between said fingers (22) and said male member to provide a seal between said fingers (22) and said male member (40) to prevent contamination from entering said female member (12);
   said assembly (10) characterized by said sealing means (56) being integral with said locking means (62) and for extending from said locking means (62) about said distal ends (23) of said fingers (22) and interiorly of said distal ends (23) of said fingers (22) and into contact with said male member (40).

2. An assembly (10) as set forth in claim 1 further characterized by said locking means (62) comprising a locking ring (64), said female member (12) including a locking groove (66), said locking ring (64) disposed in said locking groove (66) for locking said fingers (22).

3. An assembly (10) as set forth in claim 2 further characterized by said female member (12) comprising a first inner member (14) and a second outer member (16) integrally connected to said first inner member (14).

4. An assembly (10) as set forth in claim 3 further characterized by said first inner member (14) being annular and having a shoulder (18) extending radially therefrom.

5. An assembly (10) as set forth in claim 4 further characterized by said second outer member (16) comprising said annular portion (20) of said female member (12) disposed about said first inner member (14) and engaging said shoulder (18), and said fingers (22) extending longitudinally from said annular portion (20).

6. An assembly (10) as set forth in claim 5 further characterized by said female member (12) having an inner annular groove (52), said male member (40) having an outer radial flange (54), said outer radial flange (54) disposed in said inner annular groove (52) for preventing relative longitudinal movement between said male (40) and said female (12) members.

7. An assembly (10) as set forth in claim 6 further characterized by said female member (12) including outer sealing means (38) disposed about said first inner member (14) and said second outer member (16) for preventing contaminants from moving therepast.

8. An assembly (10) as set forth in claim 7 further characterized by said outer sealing means (38) comprising an annular boot (38) engaging said shoulder (18) of said first inner member (14) and said annular portion (20) of said second outer member (16).

9. An assembly (10) as set forth in claim 8 further characterized by said female member (12) including engagement means (32) for securing said female member (12) to a fitting.

10. An assembly (10) as set forth in claim 9 further characterized by said engagement means (32) comprising a longitudinally extending tube portion (34) having a plurality of barbs (36) thereon for engaging the fitting.

11. An assembly (10) as set forth in claim 10 further characterized by said first inner (14) and said second outer (16) members forming a groove (28) therebetween, said assembly (10) including inner sealing means (30) disposed in said groove (28) for preventing fluid from moving therepast.

12. An assembly (10) as set forth in claim 11 further characterized by said inner sealing means (30) comprising an O-ring seal.

13. A quick connect hose coupling assembly (10) comprising:
   a female member (12) adapted to receive a male member (40) and having an annular portion (20) and plurality of fingers (22), each of said fingers (22) extending longitudinally from said annular portion (20) to a distal end and expandable radially outwardly;
   locking means (62) for disposition about the exterior of said female member (12) for selectively locking said fingers (22) by preventing outward radial movement of said distal ends (23) of said fingers (22);
   said female member (12) including sealing means for disposition on said distal ends (23) of said fingers (22) between said fingers (22) and the male member (40) to provide a seal between said fingers (22) and the male member (40) to prevent contamination from entering said female member (12);
   said assembly (10) characterized by said sealing means (56) being integral with said locking means (62) and for extending from said locking means (62) about said distal ends (23) of said fingers (22) and interiorly of said distal ends of said fingers (22) and in to contact with the male member (12).

14. An assembly (10) as set forth in claim 13 further characterized by said locking means (62) comprising a locking ring (64), said female member (12) including a locking groove (66), said locking ring (64) disposed in said locking groove (66) for locking said fingers (22).

15. An assembly (10) as set forth in claim 14 further characterized by said female member (12) comprising a first inner member (14) and a second outer member (16) integrally connected to said first inner member (14).

16. An assembly (10) as set forth in claim 15 further characterized by said first inner member (14) being annular and having a shoulder (18) extending radially therefrom.

17. An assembly (10) as set forth in claim 16 further characterized by said second outer member (16) comprising said annular portion (20) of said female member (12) disposed about said first inner member (14) and engaging said shoulder (18), and said fingers (22) extending longitudinally from said annular portion (20).

18. An assembly (10) as set forth in claim 17 further characterized by said female member (12) having an inner annular groove (52), said male member (40) having an outer radial flange (54), said outer radial flange (54) disposed in said inner annular groove (52) for preventing relative longitudinal movement between said male (40) and said female (12) members.

19. An assembly (10) as set forth in claim 18 further characterized by said female member (12) including outer sealing means (38) disposed about said first inner member (14) and said second outer member (16) for preventing contaminants from moving therepast.

20. An assembly (10) as set forth in claim 19 further characterized by said outer sealing means (30) comprising an annular boot (38) engaging said shoulder (18) of said first inner member (14) and said annular portion (20) of said second outer member (16).

21. An assembly (10) as set forth in claim 20 further characterized by said female member (12) including engagement means (32) for securing said female member (12) to a fitting.

22. An assembly (10) as set forth in claim 21 further characterized by said engagement means (32) comprising a longitudinally extending tube portion (34) having a plurality of barbs (36) thereon for engaging the fitting.

23. An assembly (10) as set forth in claim 22 further characterized by said first inner (14) and said second outer members (16) forming a groove (28) therebetween, said assembly (10) including inner sealing means (30) disposed in said groove (28) for preventing fluid from moving therepast.

24. An assembly (10) as set forth in claim 23 further characterized by said inner sealing means (30) comprising an O-ring seal.

* * * * *